(12) United States Patent
van der Meijden et al.

(10) Patent No.: US 12,458,911 B2
(45) Date of Patent: Nov. 4, 2025

(54) FILTERS PRINCIPALLY FOR USE IN CONNECTION WITH SWIMMING POOLS AND SPAS

(71) Applicant: Zodiac Pool Systems LLC, Carlsbad, CA (US)

(72) Inventors: Abian van der Meijden, Midrand (CA); Hendrikus Johannes van der Meijden, Midrand (CA)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 528 days.

(21) Appl. No.: 16/431,965

(22) Filed: Jun. 5, 2019

(65) Prior Publication Data

US 2019/0388807 A1    Dec. 26, 2019

Related U.S. Application Data

(60) Provisional application No. 62/688,537, filed on Jun. 22, 2018.

(51) Int. Cl.
| | | |
|---|---|---|
| *B01D 29/01* | (2006.01) | |
| *C02F 1/00* | (2023.01) | |
| *C02F 103/42* | (2006.01) | |
| *E04H 4/12* | (2006.01) | |

(52) U.S. Cl.
CPC ............ *B01D 29/016* (2013.01); *C02F 1/001* (2013.01); *E04H 4/1218* (2013.01); *C02F 2103/42* (2013.01)

(58) Field of Classification Search
None
See application file for complete search history.

(56) References Cited

U.S. PATENT DOCUMENTS

| | | | | |
|---|---|---|---|---|
| 1,690,564 | A * | 11/1928 | Ward .................. | B01D 29/232 210/441 |
| 1,742,743 | A * | 1/1930 | Worbois ................. | B01D 25/24 210/454 |
| 1,805,903 | A * | 5/1931 | Bull ..................... | B01D 35/147 210/446 |
| 2,255,937 | A * | 9/1941 | McNamara ........... | B01D 25/24 210/487 |

(Continued)

FOREIGN PATENT DOCUMENTS

| | | |
|---|---|---|
| DE | 102012011816 | 1/2013 |
| EP | 2725169 | 4/2014 |

(Continued)

OTHER PUBLICATIONS

International Application No. PCT/US2019/035539, International Preliminary Report on Patentability, mailed on Dec. 30, 2020, 8 pages.

(Continued)

*Primary Examiner* — Robert J Popovics
(74) *Attorney, Agent, or Firm* — Kilpatrick Townsend & Stockton LLP (57) ABSTRACT

Filter assemblies are described which may be rolled for use and unrolled for cleaning. Rolling an assembly may form a spiral path for fluid to flow. Fluid also may flow through mesh panels of the assembly unless such panels are obstructed, as by debris.

13 Claims, 7 Drawing Sheets

(56) References Cited

U.S. PATENT DOCUMENTS

| | | | | |
|---|---|---|---|---|
| 2,322,548 A * | 6/1943 | Sigmund | B01D 25/24 | 55/484 |
| 2,519,506 A * | 8/1950 | Russell | B01D 25/24 | 210/486 |
| 2,647,637 A * | 8/1953 | Leet | B01D 25/24 | 210/442 |
| 2,883,058 A * | 4/1959 | Jaume | B01D 29/23 | 210/483 |
| 2,889,932 A * | 6/1959 | Mackintosh | B01D 25/24 | 210/450 |
| 3,037,637 A * | 6/1962 | Bub | B01D 39/14 | 210/493.4 |
| 3,095,370 A * | 6/1963 | Krogman | B01D 29/114 | 210/136 |
| 3,112,262 A * | 11/1963 | Parkinson | B01D 35/147 | 210/446 |
| 3,415,384 A * | 12/1968 | Kasten | B01D 17/045 | 55/486 |
| 3,807,570 A * | 4/1974 | Allan | B01D 25/24 | 210/497.2 |
| 3,945,923 A * | 3/1976 | Rogers | C02F 1/004 | 210/260 |
| 4,083,780 A * | 4/1978 | Call | B01D 53/22 | 210/321.74 |
| 4,231,878 A * | 11/1980 | Esmond | B01D 63/02 | 422/48 |
| 4,235,723 A * | 11/1980 | Bartlett, Jr. | B01D 63/101 | 210/321.83 |
| 4,253,962 A * | 3/1981 | Thompson | B01D 65/02 | 210/414 |
| 4,310,419 A * | 1/1982 | Nara | B01D 25/24 | 210/493.4 |
| 4,496,461 A * | 1/1985 | Leeke | B01D 15/22 | 162/181.6 |
| 4,877,527 A * | 10/1989 | Brownell | B01D 29/111 | 55/498 |
| 4,938,869 A * | 7/1990 | Bayerlein | B01D 29/216 | 210/493.4 |
| 5,114,582 A * | 5/1992 | Sandstrom | B01D 63/10 | 210/493.4 |
| 5,137,637 A * | 8/1992 | Korin | B01D 63/16 | 210/321.74 |
| 5,266,195 A * | 11/1993 | Hopkins | B01D 63/10 | 210/493.4 |
| 5,338,446 A * | 8/1994 | Schuman | E04H 4/1645 | 210/453 |
| 5,338,450 A * | 8/1994 | Maurer | B01J 8/0235 | 210/493.4 |
| 5,755,962 A * | 5/1998 | Gershenson | B01D 63/00 | 210/497.1 |
| 5,866,000 A * | 2/1999 | Yeh | B01D 17/0217 | 210/493.4 |
| 5,897,779 A * | 4/1999 | Wisted | G01N 30/6091 | 210/493.4 |
| 6,153,098 A * | 11/2000 | Bayerlein | B01D 29/216 | 210/493.4 |
| 6,379,437 B1 | 4/2002 | Heinonen | B01D 53/02 | 96/135 |
| 6,602,407 B2 * | 8/2003 | Talbot | B01J 19/2495 | 210/615 |
| 6,749,669 B1 * | 6/2004 | Griffiths | B03C 3/28 | 96/99 |
| 7,354,512 B1 | 4/2008 | Barbe | | |
| 7,459,082 B2 * | 12/2008 | Tung | B01D 63/10 | 210/493.4 |
| 7,708,149 B2 * | 5/2010 | Pank | B01D 25/24 | 210/170.03 |
| 8,496,825 B1 * | 7/2013 | Jons | B01D 69/02 | 210/500.21 |
| 8,524,081 B2 * | 9/2013 | Stanfel | F02M 37/24 | 210/DIG. 5 |
| 8,573,407 B2 * | 11/2013 | Jacobs | B01J 20/106 | 210/256 |
| 8,661,648 B2 * | 3/2014 | Jons | B01D 63/10 | 210/321.74 |
| 8,673,148 B2 * | 3/2014 | Straeffer | B01D 63/1031 | 210/493.4 |
| 8,808,645 B2 * | 8/2014 | Jackson | B29D 11/0074 | 210/488 |
| 8,991,027 B2 * | 3/2015 | Jons | B01D 63/101 | 210/321.74 |
| 9,408,986 B2 * | 8/2016 | Mccullough | B01D 11/00 | |
| 9,650,862 B2 * | 5/2017 | Husveg | E21B 34/02 | |
| 9,725,344 B1 * | 8/2017 | Jons | C02F 3/109 | |
| 10,286,361 B2 * | 5/2019 | Jons | B01D 63/12 | |
| 10,335,737 B2 * | 7/2019 | Jons | B01D 61/04 | |
| 10,358,366 B2 * | 7/2019 | Jons | B01D 63/12 | |
| 11,090,612 B2 * | 8/2021 | Roderick | C02F 1/441 | |
| 11,612,862 B2 * | 3/2023 | Roderick | B01D 63/107 | 210/321.74 |
| 2001/0037982 A1 * | 11/2001 | Pulek | B01D 39/1623 | 210/321.74 |
| 2003/0164326 A1 * | 9/2003 | Eberl | A62B 23/02 | 210/295 |
| 2005/0242014 A1 | 11/2005 | Schneider | | |
| 2006/0169631 A1 * | 8/2006 | Tung | B01D 63/10 | 210/321.74 |
| 2008/0217238 A1 * | 9/2008 | Pank | B01D 25/24 | 210/487 |
| 2009/0200226 A1 * | 8/2009 | Straeffer | B01D 63/12 | 210/321.74 |
| 2011/0120931 A1 * | 5/2011 | Meyer-Blumenroth | B01D 63/1031 | 210/457 |
| 2012/0298570 A1 * | 11/2012 | Osawa | B01D 61/08 | 210/252 |
| 2013/0100436 A1 * | 4/2013 | Jackson | B29D 11/0074 | 204/627 |
| 2014/0076789 A1 | 3/2014 | Shlomi-shlomi et al. | | |
| 2015/0336056 A1 * | 11/2015 | Ouchi | B01D 67/0088 | 422/211 |
| 2016/0305144 A1 | 10/2016 | Maggeni et al. | | |
| 2019/0388807 A1 * | 12/2019 | van der Meijden | C02F 1/001 | |
| 2022/0212146 A1 * | 7/2022 | Steen | C02F 1/44 | |

FOREIGN PATENT DOCUMENTS

| | | |
|---|---|---|
| WO | 9933582 | 7/1999 |
| WO | 2017033195 | 3/2017 |

OTHER PUBLICATIONS

European Application No. 19731122.8, Office Action mailed on Feb. 2, 2022, 5 pages.

International Application No. PCT/US2019/035539, International Search Report and Written Opinion mailed on Aug. 22, 2019, 13 pages.

European Application No. 19731122.8, Intention to Grant mailed on Jun. 6, 2023, 8 pages.

Australian Application No. 2019289068, First Examination Report mailed on Jun. 4, 2024, 4 pages.

Australian Application No. 2019289068, Notice of Acceptance mailed on Apr. 8, 2025, 3 pages.

Australian Patent Application No. 2019289068, Second Examination Report, Oct. 1, 2024, 3 pages.

* cited by examiner

FILTERS PRINCIPALLY FOR USE IN CONNECTION WITH SWIMMING POOLS AND SPAS

CROSS-REFERENCE TO RELATED APPLICATION

This application claims the benefit of and priority to U.S. Provisional Patent Application Ser. No. 62/688,537, filed Jun. 22, 2018, and having the same title as appears above (the "Provisional Application"), the entire contents of which Provisional Application are hereby incorporated herein by this reference.

FIELD OF THE INVENTION

This invention relates to equipment for swimming pools and spas and more particularly, although not necessarily exclusively, to rollable filters for removing debris from such pools and spas.

BACKGROUND OF THE INVENTION

U.S. Patent Application Publication No. 2016/0305144 of Maggeni, et al., details pool cleaning robots having protracted filters. The filters are described as being "shaped as a long sleeve." See Maggeni, p. 3, ¶0107. In general, a filter may be rolled or folded in a holding mechanism prior to use and wound around an axle after use. See id., p. 4, ¶¶0119, 0125-0127. While in use, however, the filter presents predominantly a rectilinear shape for exposure to pool water as illustrated in, e.g., FIG. 4 of the Maggeni application.

U.S. Patent Application Publication No. 2014/0076789 of Shlomi-Shlomi, et al., illustrates other pool cleaning apparatus. According to the Shlomi-Shlomi application, a cylindrical filter and a spiral guide cooperate to form "a first space that has a spiral portion." See Shlomi-Shlomi, p. 1, ¶0004; p. 4, ¶¶0083-0087. Alternatively, the filter may have the "spiral" shape illustrated in its FIG. 9. See id., p. 5, ¶0108; see also id., p. 1, ¶¶0023-0024. Neither version of the filter is rolled in use, however, nor is either version unrolled for cleaning.

SUMMARY OF THE INVENTION

The present invention seeks to supply filter assemblies which may be rolled when in use. At least some versions of the invention may be rolled in a manner forming a continuous spiral path for fluid to flow from an external entrance to a core of the filter assembly. Alternatively, the spiral path may be discontinuous. In either circumstance, fluid also may flow through mesh panels of the assembly (except as obstructed by debris or otherwise).

Versions of these filter assemblies additionally may be unrolled for cleaning. Completely unrolling an assembly exposes most, if not all, of its mesh panels, facilitating spraying of the panels with clean, pressurized water (for example). Even partially unrolling the assembly may aid in cleaning, however.

When a filter assembly is rolled for use, spacers may be employed to separate mesh panels and form gaps therebetween. If desired, barriers may be positioned in various of these gaps to redirect water flow through various mesh panels. Generally, though, fluid may be capable of flowing through at least some panels and at least some gaps so that obstruction of one path does not prevent flow through an assembly. In particular, when debris clogs the mesh panels, flowing water essentially by-passes the clogged panels by remaining in the gaps of the assembly.

The filter assemblies are especially beneficial for filtering debris-laden water of swimming pools and spas. In such cases the assemblies may be located in any suitable positions within water-circulation systems of the pools or spas (including on-board mobile pool cleaning apparatus). Openings of mesh panels of the assemblies need not necessarily be sized identically, hence providing different levels of debris filtration within a single assembly.

It thus is an optional, non-exclusive object of the present invention to provide assemblies for filtering fluid.

It is another optional, non-exclusive object of the present invention to provide spirally-wound fluid filters.

It is also an optional, non-exclusive object of the present invention to provide fluid filters in which mesh panels are wound in layers with gaps between adjacent layers.

It is a further optional, non-exclusive object of the present invention to provide fluid filters which may be rolled and unrolled.

It is an additional optional, non-exclusive object of the present invention to provide fluid filters which may be rolled for use and unrolled for cleaning.

It is, moreover, an optional, non-exclusive object of the present invention to provide fluid filters including mesh panels, openings of which may be sized differently among (or possibly even within) panels.

Other objects, features, and advantages of the present invention will be apparent to persons skilled in the relevant field with reference to the remaining text and the drawings of this application.

DESCRIPTION OF THE INVENTION

Figure 1:
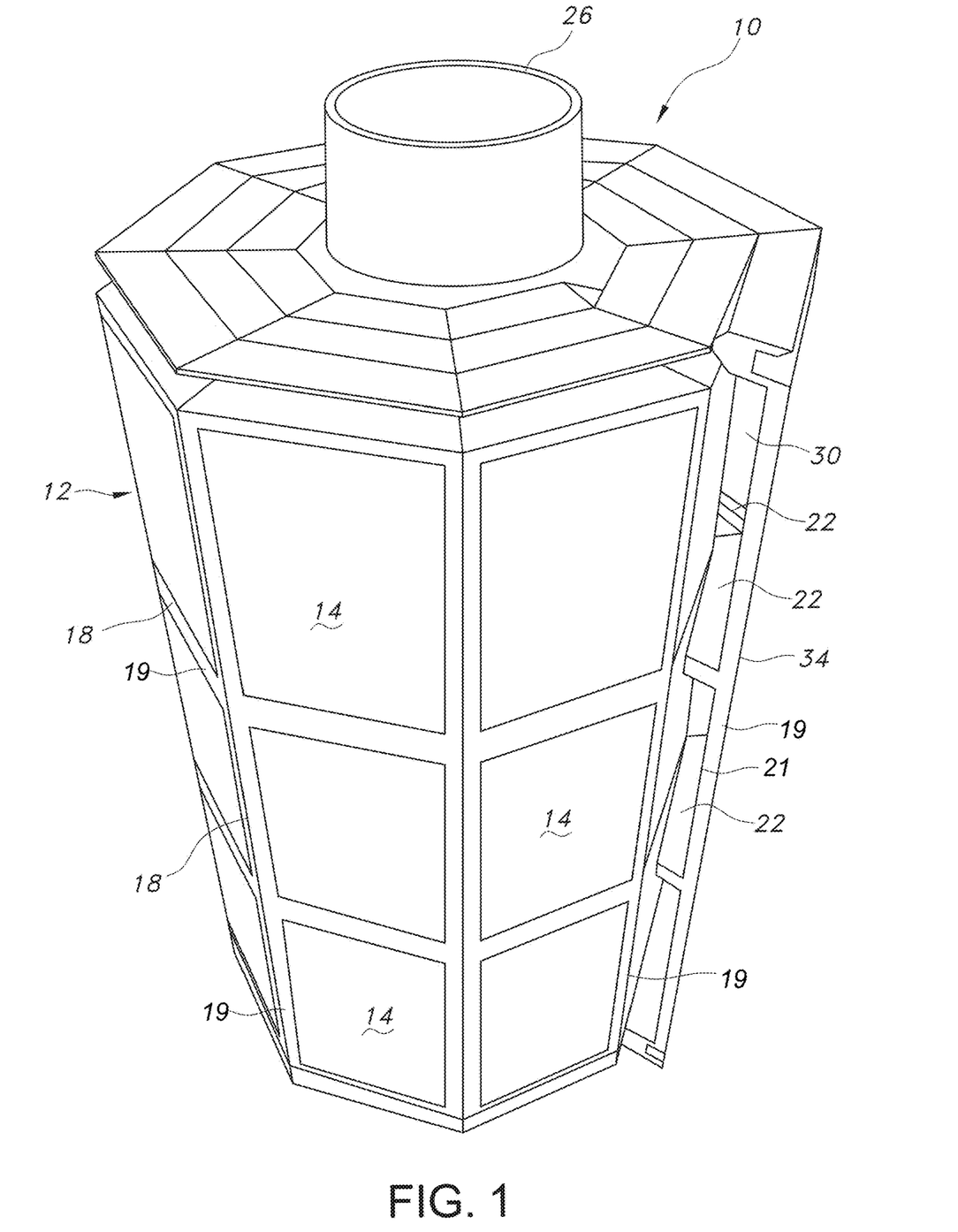
FIG. 1 is a perspective view of an exemplary filter assembly consistent with the present invention as shown in a rolled condition.
Figure 2:
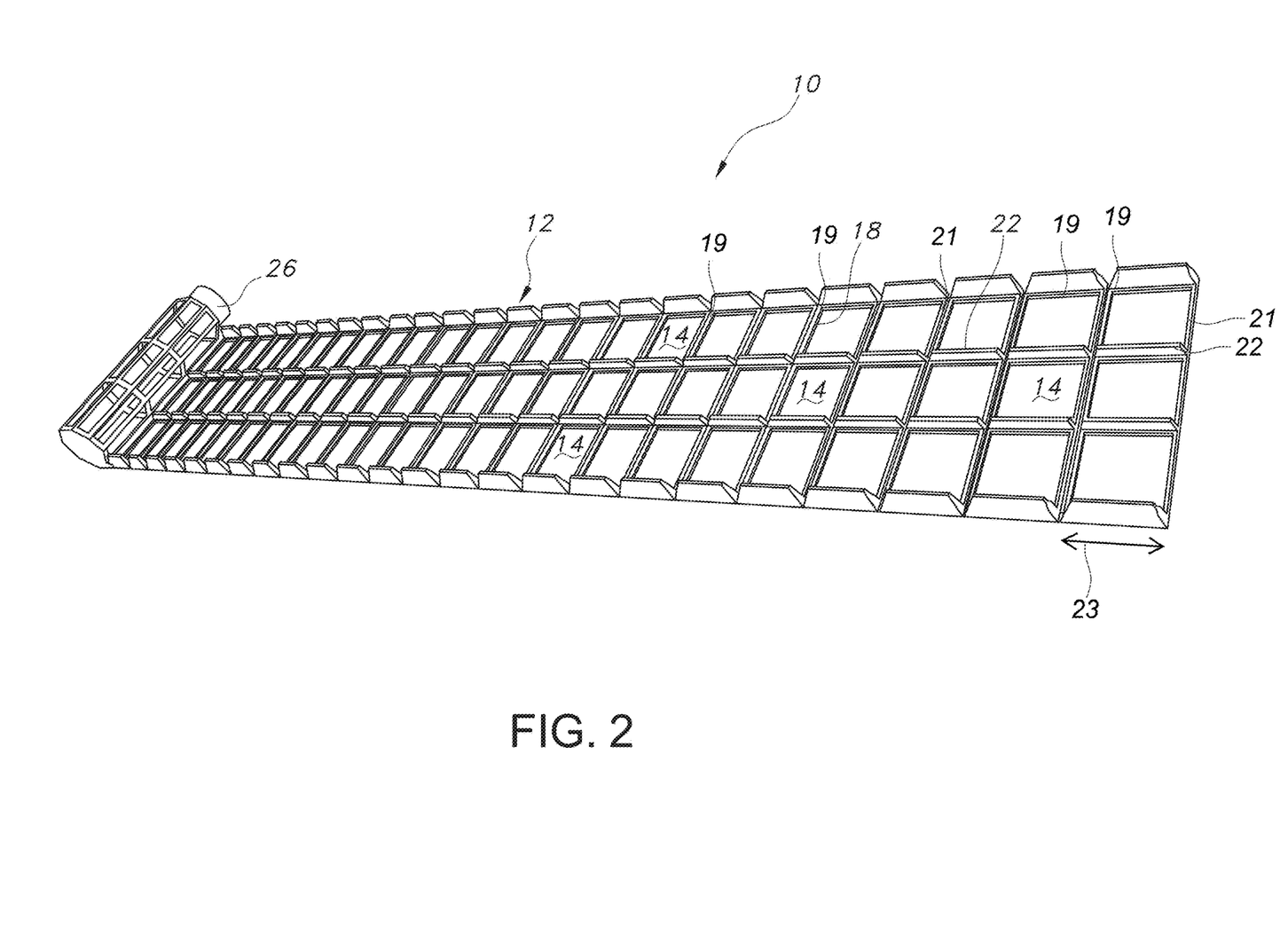
FIG. 2 is a perspective view of the filter assembly of FIG. 1 as shown in an unrolled condition.

FIGS. 1-2 depict an exemplary filter assembly 10 of the present invention. Filter assembly 10 may comprise a wall 12 including one or more panels 14 of mesh material inserted into or attached to framework 18 in any suitable manner. Framework includes framework sections 19 as illustrated in FIGS. 1 and 2. Framework 18 additionally may include one or more spacers 22 as well as core 26. The one or more spacers 22 extend outwards from a side 21 of a corresponding framework section 19 as illustrated in FIGS. 1 and 2. The one or more spacers 22 extend at least partially along a length (direction of arrow 23 in FIG. 2) of the corresponding framework section.

FIG. 1 illustrates filter assembly 10 in a "rolled" condition for use, while FIG. 2 details filter assembly 10 in an "unrolled" condition for, e.g., cleaning. As shown in FIG. 1, filter assembly 10 may assume a shape resembling a cylinder when rolled for use. Both panels 14 and framework 18 are sufficiently flexible to permit this rolling of wall 12 about its core 26. Such flexibility may be achieved in any appropriate way including, for example, by employing living hinges as part of framework 18.

Figure 3:
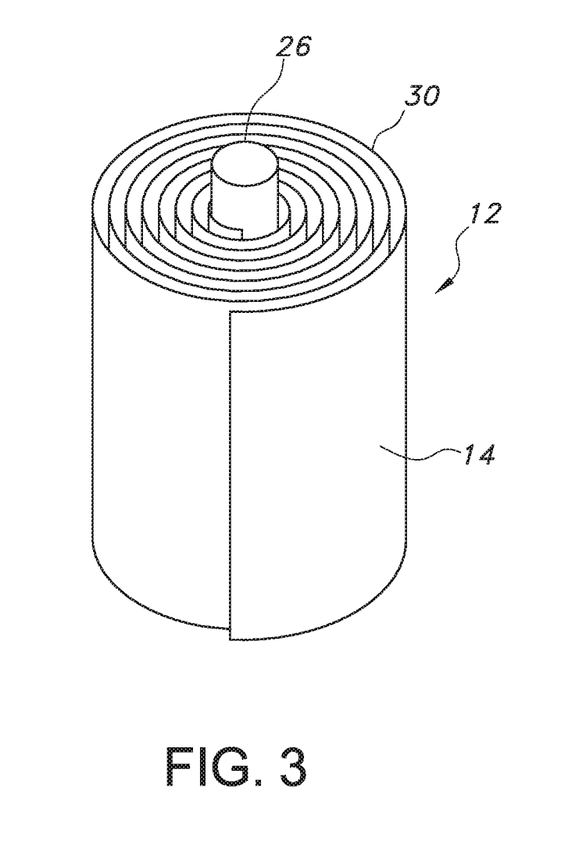
FIG. 3 is a schematicized illustration of an exemplary filter assembly consistent with the present invention similar to that of FIGS. 1-2 showing spacing between mesh panels of the assembly.

When filter assembly 10 is rolled, spacers 22 of framework 18 function to separate mesh panels 14, as shown in FIG. 1. In essence, wall 12 is wound in spiral manner, with spacers 22 creating unfilled gaps 30 between adjacent layers of mesh panels 14 in a radial direction as shown in FIGS. 1, 3, and 4A-E. FIG. 3 schematically illustrates these gaps 30, which may form a continuous spiral path from an external entrance 34 of filter assembly 10 to core 26 and may, but need not necessarily, have generally uniform width. Alternatively, entrance 34 may be closed or otherwise obstructed, preventing debris-laden water from entering a gap 30 until after the water has passed through at least an outermost mesh panel 14. Barriers additionally may be placed at various locations in gaps 30 to redirect water through certain nearby panels 14.

Filter assembly 10 is designed principally for filtering debris-laden water of swimming pools and spas. It may be used as a stationary pool cartridge filter or located on-board a mobile pool cleaning apparatus such as (but not limited to) those of the Maggeni and Shlomi-Shlomi applications. Persons skilled in the art will recognize that filter assembly 10 may be used otherwise as appropriate or desired and could, for example, conceivably filter air.

Figure 4A:
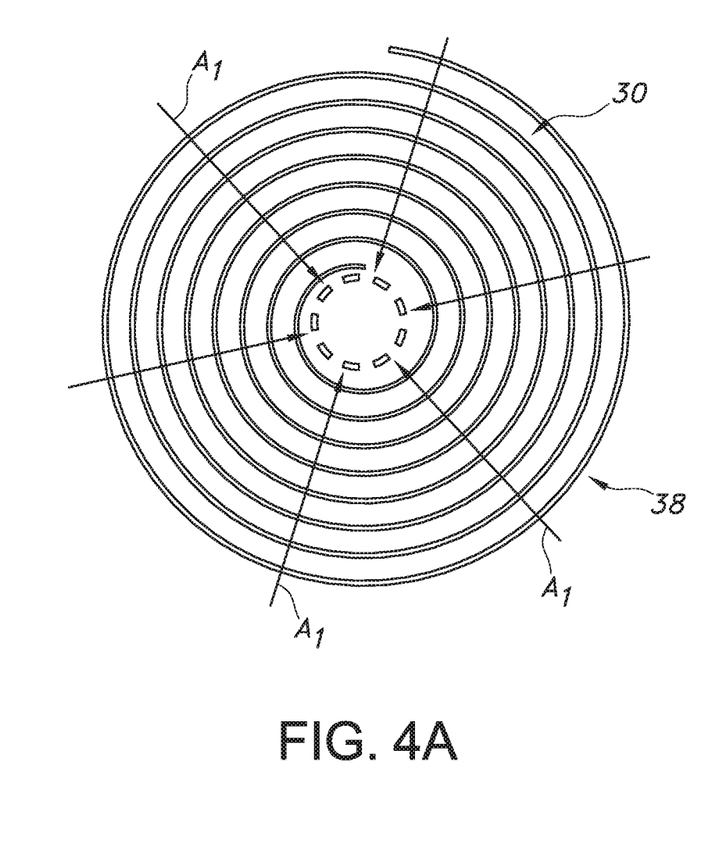
FIGS. 4A-E are schematized views of an exemplary filter assembly consistent with the present invention conceptually showing fluid flow therein.

FIGS. 4A-E sequentially depict fluid flow that may occur within filter assembly 10. In general, the debris-laden water will travel in the least-restrictive path to an area of lowest pressure. When mesh panels 14 are generally uniformly clean, many paths of similar resistance may exist through panels 14 from exterior 38 of filter assembly 10 to core 26. Arrows A1 of FIG. 4A illustrate some of these paths. (As an alternative, debris-laden liquid may enter filter assembly 10 through core 26 and be filtered as it travels "outward"—i.e. opposite the direction of arrows A1—to exterior 38.)

As mesh panels 14 adjacent exterior 38 become clogged with debris, water may flow into entrance 34 (if not closed) and through a gap 30 before passing through less-clogged panels 14. This effect is illustrated by arrows A2 of FIG. 4B. In effect, the water utilizes gap 30 to bypass the clogged panels 14 adjacent exterior 38.

Figure 4B:
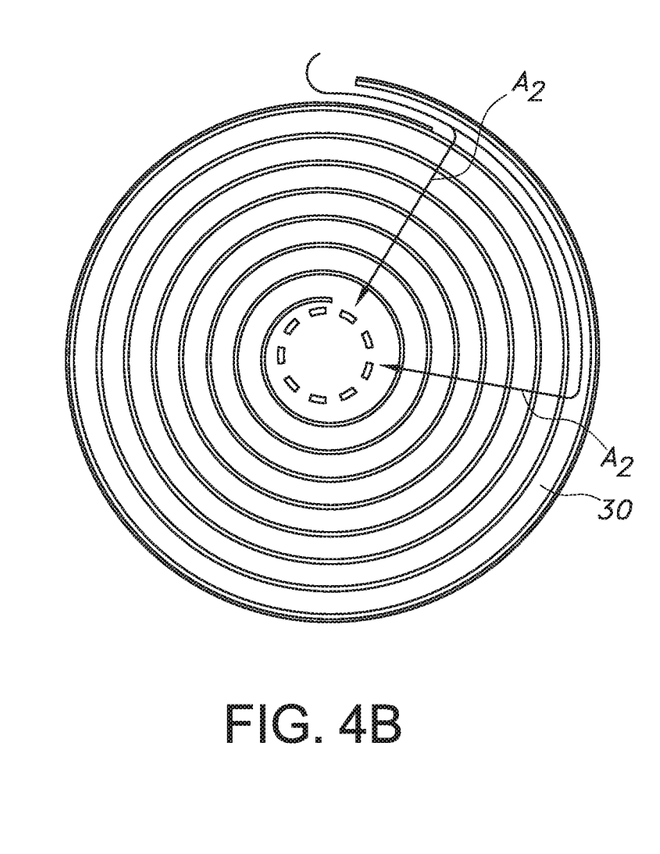
Figure 4C:
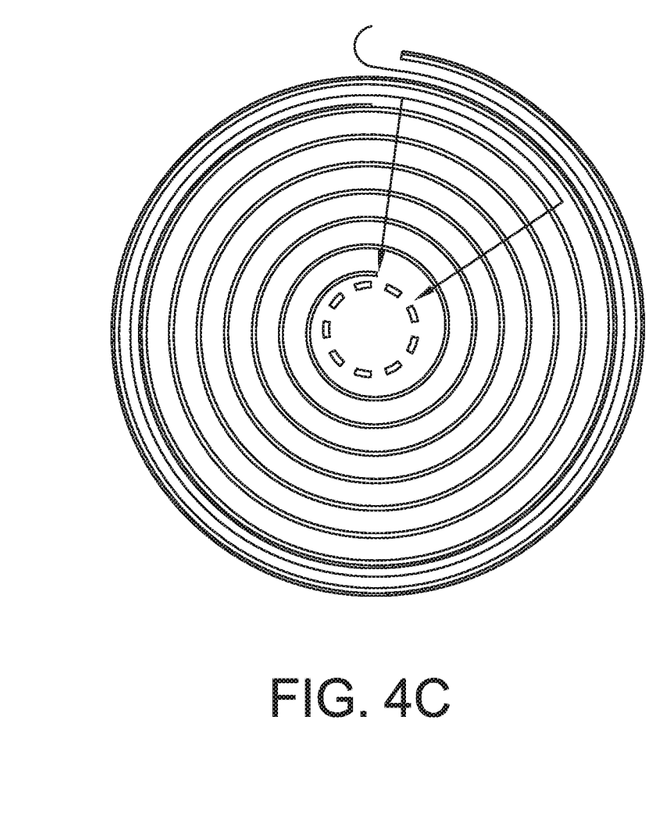
Figure 4D:
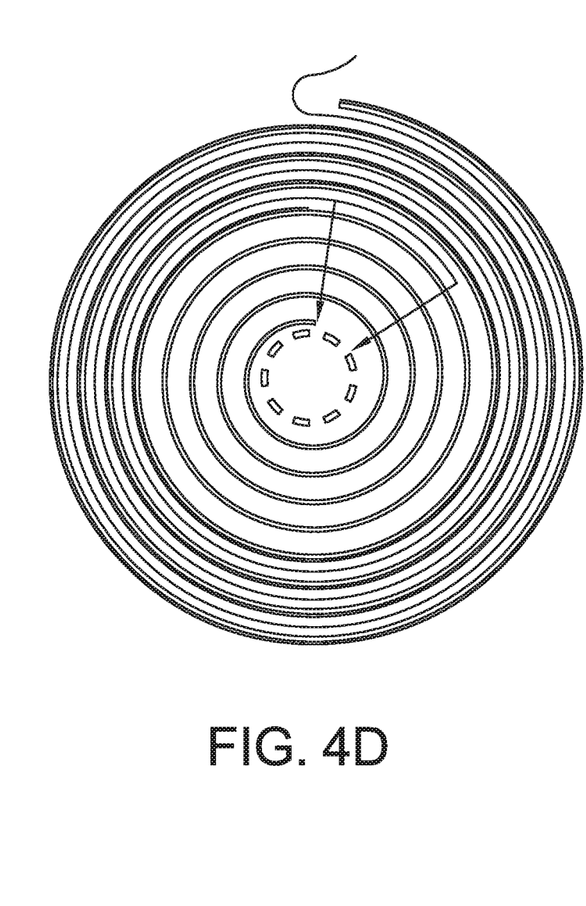

As shown in FIGS. 4C-D, this bypassing continues to occur as more of mesh panels 14 become obstructed with debris. Such obstruction generally itself continues in a spiral path consistent with FIGS. 4A-E. If mesh panels 14 of filter assembly 10 are permitted to become completely clogged with debris, the result will resemble FIG. 4E, in which the water flow to generally-hollow core 26 is (more or less) completely through gaps 30. In this instance, relatively little (or no) filtering will occur, in effect creating a natural filtration "by-pass." Such by-pass may be advantageous in some situations as, for example, when filter assembly 10 is part of a pool cleaning device needing water thrust to travel within a pool.

Figure 5:
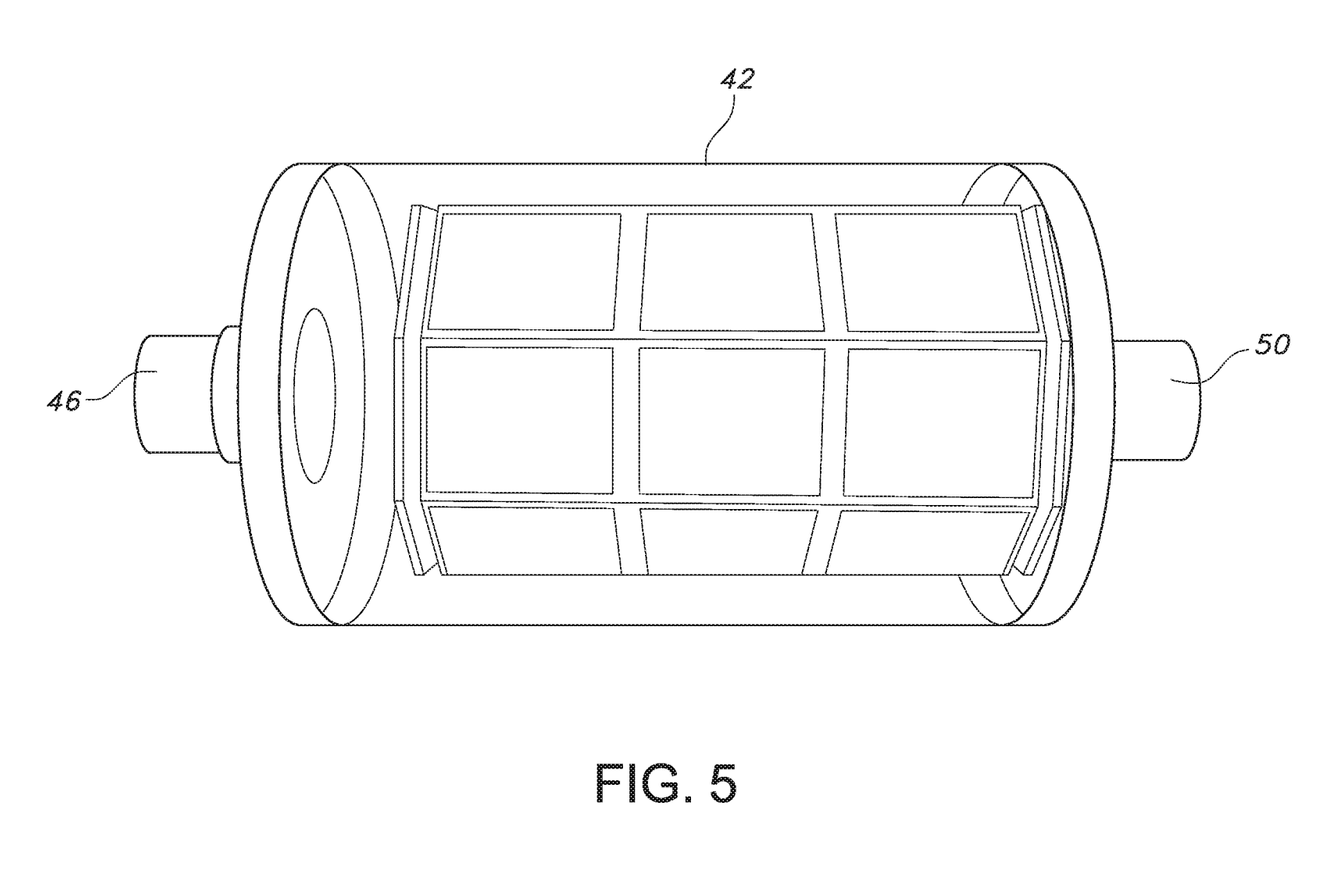
FIG. 5 is a perspective view of the filter assembly of FIG. 1 shown within a housing.

Depicted in FIG. 5 is filter assembly 10 optionally positioned within housing 42. Housing 42 may include both an inlet 46 and an outlet 50 (or vice-versa) and be plumbed as part of a water-circulation system of a pool or spa. Core 26 may align with outlet 50 so that filtered water having passed through mesh panels 14 to core 26 may then exit housing 42 through outlet 50. Conceivable as well is that filter assembly 10 and housing 42 may be integrated into a unitary canister.

Figure 6:
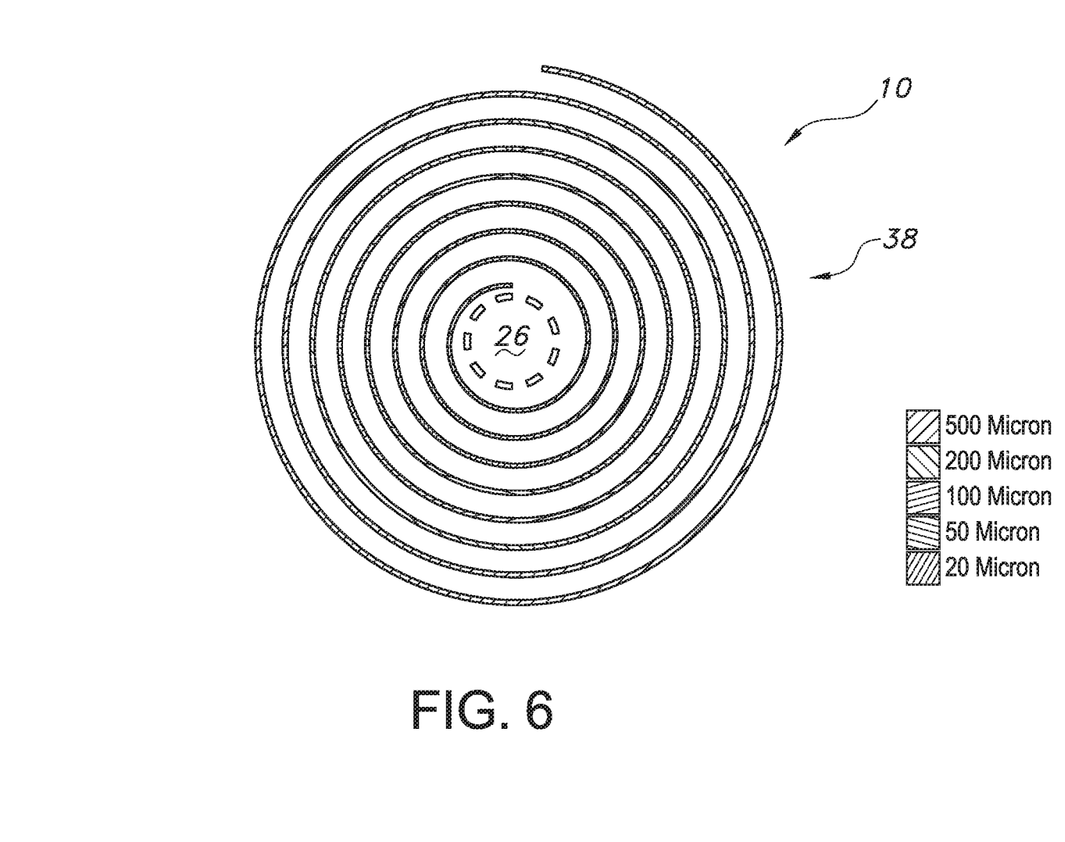
FIG. 6 is a schematicized illustration of an exemplary filter assembly consistent with the present invention showing non-uniformly-sized mesh panels of the assembly.

Schematically detailed in FIG. 6 is that mesh panels 14 need not be uniformly sized throughout wall 12. Instead, some panels 14 may be coarser, while others are finer. In at least one version of filter assembly 10, mesh panels 14 adjacent exterior 38 are coarser than mesh panels 14 adjacent core 26. This change in size of mesh panels 14, further, may occur in stages consistent with FIG. 6: Openings of the mesh panels 14 adjacent exterior 38 may be 500 microns in size; spiraling inward toward core 26, openings of the next stage of mesh panels 14 are 200 microns, followed by the next stages of openings respectively being 100 microns, 60 microns, and 20 microns, respectively. Although these sizes of openings of mesh panels 14 are merely examples of numerous sizes that may be employed, clear is that this version of filter assembly 10 will progressively filter smaller and smaller particles from debris-laden water as the water flows toward core 26. Once dirty, filter assembly 10 may be cleaned by unrolling it (in whole or in part), as shown in FIG. 2, and sprayed, for example, with clean, pressurized water. Filter assembly 10 thereafter may be re-rolled (see FIG. 1) for re-use.

Exemplary concepts or combinations of features of the invention may include:

A. A spirally-wound filter of fluid.

B. A fluid filter comprising mesh wound in layers in a generally spiral pattern and one or more spacers forming at least one gap between at least two adjacent layers through which fluid may flow.

C. A fluid filter comprising mesh panels and a framework, with the filter being rollable for use and unrollable for cleaning.

D. A fluid filter comprising a wall including (i) a framework having a core and one or more spacers and (ii) one or more panels of mesh material inserted into or attached to the framework, and in which the wall may be rolled for use in filtering debris-laden water of a pool or spa and unrolled for cleaning.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

Optionally, an automated or semi-automated cleaning machine could be created in which filter assembly 10 is unrolled between top and bottom sprayer arrangements and re-rolled. A user of the machine might need to remove and replace the spiral filter from the machine. The machine also could be water-powered as, for example, by pressurized water exiting a garden hose or faucet.

If filter assembly 10 is stood on one of its ends in operation, and the lowest section of the assembly is blanked off to form numerous small cavities open only to the top, then, when the pump motor is switched off, most debris particles fall down from the filter media into these pockets by gravity, and also because the pump's switch off causes a pulse of backpressure. This serves as a self-cleaning mechanism of the filtration media. The cavities or pockets filled with debris have to be shielded from the spiral flow that will eventually naturally occur again on switch-on, but the total capacity for picking up fine debris will be vastly increased by cycling the pump several times during the cleaning cycle.

This blanked-off section of the filter splits open completely in the same way as the rest of the filter when the filter is unrolled and is cleaned by spraying. The ribs that space the panels or spiral media away from each other might have to be adjusted in shape so as to aid the debris falling down under gravity to the cavities.

In some versions of filter assembly 10, semi-rigid interlocking spacers could be insert-molded to mesh panels 14 to create a truer spiral shape. Alternatively or additionally, spiral construction could be achieved by having spaced end caps with spiral slots though which a film of filter material with appropriate retaining means is fed. Moreover, when finer grade mesh is employed in inner regions of assembly 10, filter clogging might not always progress from outer to inner regions. In such cases water may continue to move through the outer unclogged mesh and then spirally around clogged areas until a clear path to the core is available.

Text present in the drawings submitted as part of the Provisional Application but omitted from the current drawings includes:

FIGS. 3 and 4A: Water flow and particles take easiest path to lowest pressure, through the mesh.

FIG. 4B: As mesh gets clogged (indicated by brown) water starts to flow past, choosing the next easiest path.

Figure 4E:
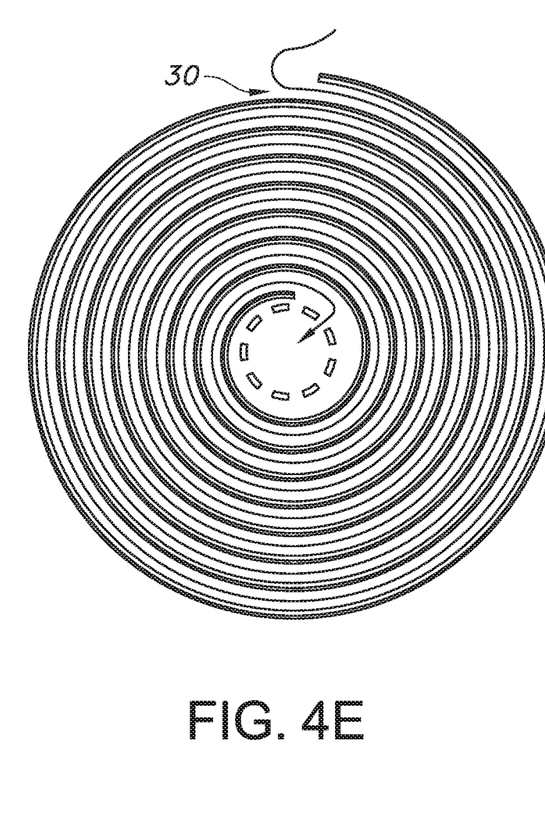

FIGS. 4C-E: Mesh progressively continues to clog spirally, until all filter media is covered and an optional bypass stage is reached.

FIG. 6: Filter media can progressively be graded from coarse to fine.

The Provisional Application also included a FIG. 7 entitled "RECAP" and containing text reciting:

1. Spirally wound filter media with gap between layers.
2. Debris laden water takes shortest path (of least resistance) to lowest pressure through filter media.
3. Filter media becomes a "wall" when clogged with debris, forcing water to spiral to next available shortest path.
4. This continues until spiral is completely coated with debris.
5. Water can find bypass, if included.
6. Unroll spiral for easy access and thorough cleaning of filter media.

The entire contents of the Maggeni and Shlomi-Shlomi applications are incorporated herein by this reference. Further, although applicant has described filter assemblies and techniques for use principally with swimming pools, persons skilled in the relevant field will recognize that the present invention may be employed in connection with other objects and in other manners. Finally, references to "pools" and "swimming pools" herein may also refer to spas or other water containing vessels used for recreation or therapy and for which filtering of water or other liquid or fluid is needed or desired.

What is claimed is:

1. A method of filtering water of a swimming pool or spa comprising:
    a. positioning a filter assembly in a water-circulation system or a mobile pool cleaning apparatus of the swimming pool or spa, the filter assembly comprising:
    a framework comprising a plurality of framework sections, wherein adjacent framework sections of the plurality of framework sections are pivotable relative to each other such that the framework is configurable between a rolled configuration and an unrolled configuration, wherein the framework in the rolled configuration is a spiral pattern, wherein each framework section of the plurality of framework sections supports at least one panel of mesh material, wherein the framework and the mesh material together define a wall of the filter assembly, wherein, when the framework is in the rolled configuration, the framework defines an unfilled gap between and separating adjacent layers of the mesh material in a radial direction relative to the spiral pattern; and
    b. causing water of the swimming pool or spa to flow on a flow path through the filter assembly with the framework in the rolled configuration, wherein:
    when adjacent layers comprising the mesh material in the radial direction are unobstructed by debris, the flow path is in the radial direction through the mesh material; and
    when at least one layer of the adjacent layers of the mesh material is obstructed by debris, the flow path is through the unfilled gap in a spiral direction.

2. The method according to claim 1 wherein the framework defines the unfilled gap in a generally continuous spiral path toward a center of the filter assembly.

3. The method of claim 2, wherein the unfilled gap has a uniform width.

4. The method according to claim 1 in which the framework further includes a core.

5. The method according to claim 4 in which the act of causing water of the swimming pool or spa to flow through the filter assembly comprises causing water to flow through the unfilled gap from an external entrance or outermost layer of the layers of the mesh material toward the core.

6. The method according to claim 1 further comprising removing the filter assembly from the water-circulation system or the mobile pool cleaning apparatus and unwinding the framework from the rolled configuration to the unrolled configuration.

7. The method of claim 1, wherein framework further comprises:
    at least one spacer extending outwards from a side of at least one framework section and at least partially along a length of the framework section; and
    a fluid permeable hollow core defining a volume,
    wherein the at least one spacer defines the unfilled gap between the adjacent layers of the mesh material when the framework is in the rolled configuration.

8. The method of claim 1, wherein adjacent framework sections are connected by living hinges.

9. The method of claim 1, wherein each framework section comprises a plurality of panels of the mesh material.

10. The method of claim 1, wherein the mesh material is inserted into the framework.

11. The method of claim 1, wherein the mesh material is attached to the framework.

12. The method of claim 1, wherein the mesh material of one framework section and the mesh material of a second framework section are a same grade of mesh material.

13. The method of claim 1, wherein the mesh material of one framework section and the mesh material of a second framework section are different grades of mesh material.

* * * * *